(12) United States Patent
Park

(10) Patent No.: US 10,537,789 B2
(45) Date of Patent: Jan. 21, 2020

(54) GAME SYSTEM FOR PROVIDING A PUZZLE GAME AND A METHOD FOR PROVIDING A PUZZLE GAME USING THE SAME

(71) Applicant: NHN Entertainment Corporation, Seongnam-si (KR)

(72) Inventor: Jung Jun Park, Seongnam-si (KR)

(73) Assignee: NHN Entertainment Corporation, Seongnam-si (KR)

(*) Notice: Subject to any disclaimer, the term of this patent is extended or adjusted under 35 U.S.C. 154(b) by 142 days.

(21) Appl. No.: 15/416,641

(22) Filed: Jan. 26, 2017

(65) Prior Publication Data
US 2017/0209785 A1    Jul. 27, 2017

(30) Foreign Application Priority Data
Jan. 26, 2016  (KR) .................. 10-2016-0009233

(51) Int. Cl.
| | |
|---|---|
| A63F 13/24 | (2014.01) |
| A63F 9/06 | (2006.01) |
| A63F 13/35 | (2014.01) |
| A63F 13/822 | (2014.01) |
| A63F 13/30 | (2014.01) |

(52) U.S. Cl.
CPC ............ *A63F 9/0612* (2013.01); *A63F 13/35* (2014.09); *A63F 13/822* (2014.09); *A63F 13/30* (2014.09)

(58) Field of Classification Search
CPC ......... A63F 13/35; A63F 13/822; A63F 13/30
See application file for complete search history.

(56) References Cited

U.S. PATENT DOCUMENTS

| | | | |
|---|---|---|---|
| 6,267,676 B1* | 7/2001 | Nagaoka ................ | A63F 13/10 463/43 |
| 6,354,939 B1* | 3/2002 | Morita ................... | A63F 13/10 463/1 |

(Continued)

FOREIGN PATENT DOCUMENTS

| | | |
|---|---|---|
| JP | 2015-196082 | 11/2015 |
| JP | 2015-208674 | 11/2015 |

(Continued)

*Primary Examiner* — Omkar A Deodhar
*Assistant Examiner* — Shauna-Kay Hall
(74) *Attorney, Agent, or Firm* — H.C. Park & Associates, PLC

(57) ABSTRACT

A game server includes: a main processing unit, connected to a user terminal via a data network, configured to perform user login; and a game processing unit configured to control the user terminal to execute a puzzle game in response to a game execution request signal from the user terminal. The game processing unit is configured to: control the user terminal to display colored blocks arranged in a matrix form of N rows and M columns in a puzzle game area, and to display one game character in an action display area; exchange a selected block with another neighboring block based on user input; determine if a matching block group of at least three consecutive blocks having the same color results from the block exchanging step; remove the matching block group; and control the game character to perform an action according to a result of the block removing step.

48 Claims, 21 Drawing Sheets

(56) References Cited

U.S. PATENT DOCUMENTS

| | | | |
|---|---|---|---|
| 2005/0043075 A1* | 2/2005 | Lin | A63F 13/10 463/9 |
| 2005/0233793 A1* | 10/2005 | Yamada | A63F 13/00 463/9 |
| 2007/0287517 A1* | 12/2007 | Asuna | A63F 13/10 463/7 |
| 2008/0120460 A1* | 5/2008 | Sasaki | A63F 13/005 711/113 |
| 2009/0072478 A1* | 3/2009 | Tawara | A63F 13/00 273/153 R |
| 2014/0235338 A1* | 8/2014 | Hansson | G07F 17/32 463/31 |
| 2014/0302935 A1* | 10/2014 | Royce | A63F 13/822 463/42 |
| 2015/0238861 A1* | 8/2015 | Inamori | A63F 13/537 463/31 |
| 2016/0038831 A1* | 2/2016 | Katou | A63F 13/42 463/31 |

FOREIGN PATENT DOCUMENTS

| | | |
|---|---|---|
| KR | 10-2013-0121767 | 11/2013 |
| KR | 10-2015-0105166 | 9/2015 |

\* cited by examiner

GAME SYSTEM FOR PROVIDING A PUZZLE GAME AND A METHOD FOR PROVIDING A PUZZLE GAME USING THE SAME

CROSS REFERENCE TO RELATED APPLICATION

This application claims priority from and the benefit of Korean Patent Application No. 10-2016-0009233, filed on Jan. 26, 2016, which is hereby incorporated by reference for all purposes as if fully set forth herein.

BACKGROUND

Field

Exemplary embodiments relate to a method for providing a puzzle game and a game system for providing a puzzle game using the method. More specifically, exemplary embodiments relate to a method for providing a puzzle game progressed by removing three or more blocks having the same color and a game and to a game system for providing a puzzle game using the same.

Discussion of the Background

Recently, various kinds of games provided in the form of an application for smartphones have been developed. One example of such game is a puzzle game in which a user controls blocks in various directions to make a predetermined combination for clearing the spaces occupied by the blocks.

A brief description of an exemplary comparative puzzle game is as follows.

First, blocks arranged in a matrix form of N rows and M columns are displayed on the smartphone and each of the blocks has one of a plurality of colors. A user can select one of the blocks by a user touch input and drag it to a neighboring block, and then the selected block is exchanged with the neighboring block according to the user touch and drag input. Thereafter, when it is determined that the user's manipulation resulted in at least one of three or more consecutive blocks having the same color in row direction or column direction, the consecutive same-colored blocks are removed and scores are acquired.

However, the above mentioned puzzle game may be so simple that users may easily lose interest and no longer be entertained. Therefore, it may be difficult for the puzzle game provider to maintain a consistent business due to a lack of user loyalty.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a game system including a game server and a user terminal.

Additional aspects will be set forth in the detailed description which follows, and, in part, will be apparent from the disclosure, or may be learned by practice of the inventive concept.

Exemplary embodiments disclose a method performed by a user terminal for providing a puzzle game in connection with a game server via a data network, including steps of: displaying blocks arranged in a matrix form of N rows and M columns, wherein N and M are each an integer of 3 or more, in a puzzle game area, each of the blocks having one of a plurality of colors, and to display a game character in an action display area; selecting a one of the blocks in response to a user block selection input and exchanging the selected block with another block neighboring the selected block in a direction of upper, lower, left, right, upper left, lower left, upper right, and lower right in response to a user block control input; determining if a matching block group is generated as a result of the block exchanging step, the matching block group consisting of at least three consecutive blocks having the same color in the row direction or the column direction. The steps further includes removing the matching block group, and controlling the game character to perform an action according to a result of the block removing step.

Exemplary embodiments also disclose a method, performed by a game server, for providing a puzzle game, including steps of: processing a user login in response to a request from the user terminal through a data network; and controlling the user terminal to execute the puzzle game in response to a game execution request of the user terminal.

The step of controlling the user terminal to execute the puzzle game includes: controlling the user terminal to display blocks arranged in a matrix form of N rows and M columns, wherein N and M are each an integer of 3 or more, in a puzzle game area, each of the blocks having one of a plurality of colors, and to display one game character in an action display area; exchanging a block selected by a user block selection input with another block neighboring the selected block in a direction of upper, lower, left, right, upper left, lower left, upper right, and lower right in response to a user block control input; determining if determining if a matching block group is generated as a result of the block exchanging step, the matching block group consist of at least three consecutive blocks having the same color in the row direction or the column direction; removing the matching block group; and controlling the game character to perform an action according to a result of the block removing step.

Exemplary embodiments also disclose a game server including: a main processing unit, connected to a user terminal via a data network, configured to perform user login; and a game processing unit configured to control the user terminal to execute a puzzle game in response to a game execution request signal from the user terminal.

The game processing unit is configured to process: controlling the user terminal to display blocks arranged in a matrix form of N rows and M columns, wherein N and M are each an integer of 3 or more) in a puzzle game area, each of the blocks having one of a plurality of colors, and to display one game character in an action display area; exchanging a block selected by a user block selection input with another block neighboring the selected block in a direction of upper, lower, left, right, upper left, lower left, upper right, and lower right in a block exchanging step in response to a user block control input; determining if determining if a matching block group is generated as a result of the block exchanging step, the matching block group consist of at least three consecutive blocks having the same color in the row direction or the column direction; removing the matching block group in a block removing step; and controlling the game character to perform an action according to a result of the block removing step in a game character action control step.

The game processing unit may be further configured to performs processes of: filling block-removed spaces with substitution blocks from neighboring blocks, each of which was placed at a side of each block of the matching block group, and generating a block having one of the colors to fill the block-removed space if no substitution block exists in a block filling step, wherein the block-removed spaces are spaces that had been occupied by the matching block group before removing the matching block group; and repeating the block removing step, the game character action control step and the block filling step until three or more consecutive blocks having the same color in the row direction or the column direction are not generated.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
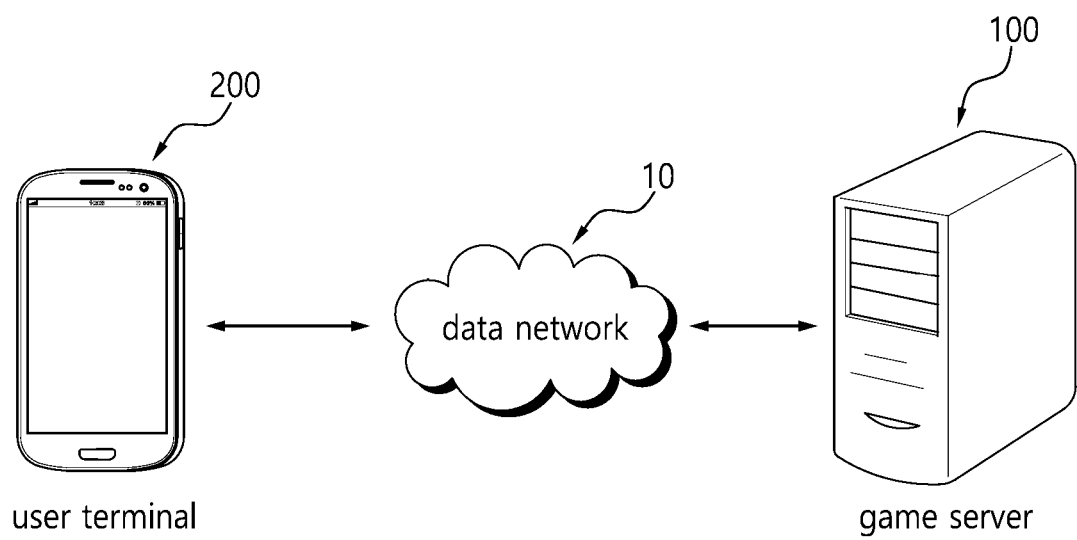
FIG. 1 is a schematic diagram illustrating a puzzle game system according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and apparatus are shown in block diagram form in order to avoid unnecessarily obscuring various exemplary embodiments.

In the accompanying figures, the size and relative sizes of elements may be exaggerated for clarity and descriptive purposes. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element or layer, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
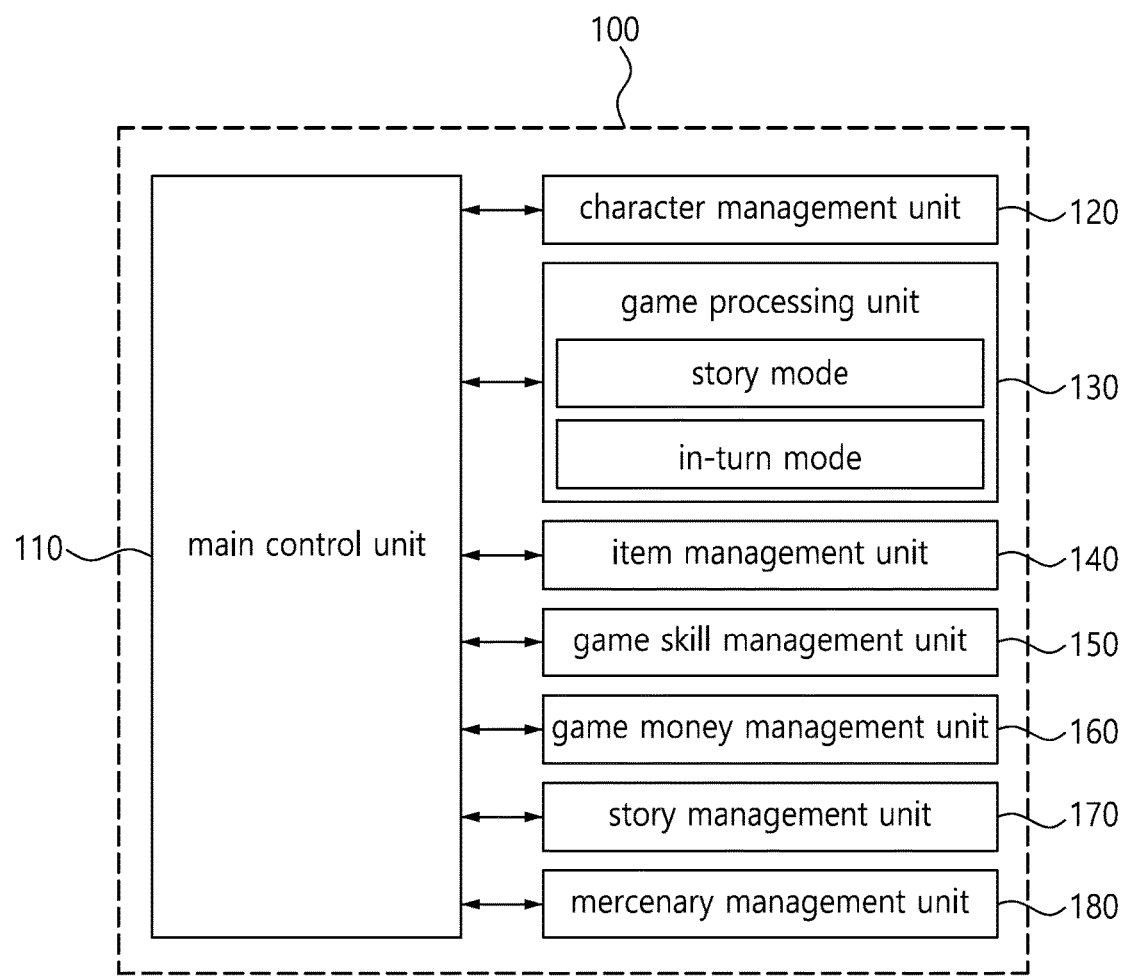
FIG. 2 is a block diagram illustrating the game server of FIG. 1 in detail.

FIG. 1 is a schematic diagram illustrating a puzzle game system according to an exemplary embodiment, and FIG. 2 is a block diagram illustrating the game server of FIG. 1 in detail.

Referring to FIGS. 1 and 2, the game server 100 according to an exemplary embodiment is a computer system, which provides a puzzle game to at least one user terminal 200 connected to the game server 100 via the data network 10 such as the Internet, comprising a main processor or main control unit 110, a character management unit 120, a game processing unit 130, an item management unit 140, the game skill management unit 150, a game money management unit 160, a story management unit 170, and a mercenary management unit 180. The user terminal 200 may be a smart device including a smart phone, a tablet PC, and the like capable of running an application program.

In the present exemplary embodiment, the components of the game server 100 may be computer components physically separated from each other, or programs functionally separated from each other within a computer system. In addition, the components of the game server 100 may be programs physically or functionally separated within a plurality of computer systems.

While the above description explains an exemplary game server, all or some of the components may be equipped on the user terminal in a form of hardware or software. Also, some of functions of the game server can be performed by the user terminal.

The main control unit 110 may perform a function of an interface that connects to the user terminal 200 via the data network 10 exchanging data and signals with the user terminal 200. In response to login input information of the user provided from the user terminal 200, the main control unit 110 may process user login. At this time, the user login may be performed in conjunction with an account currently used by the user A, for example, an account from Google, Facebook, Naver, and the like.

Also, the main control unit 110 controls the character management unit 120, the game processing unit 130, the item management unit 140, the game skill management unit 150, the game money management unit 160, the story management unit 170, and the mercenary management unit 180.

The character management unit 120 may perform a function of managing characters used in a game. For example, the character management unit 120 stores at least one user character owned by the user A, and may add a new character using game money and other methods according to a user selection. In addition, the character management unit 120 may select, in response to receiving a user input through the user terminal 200 at least one game character, which is actually applied to the puzzle game, among the at least one user character or at least one mercenary character registered by other users.

After the login process is completed by the main control unit 110, the game processing unit 130 receives the game execution request signal from the user terminal 200 and then allows the user terminal 200 to execute the puzzle game. More specifically, the game processing unit 130 may transmit puzzle data including initial arrangement of blocks to the user terminal 200, and then the user terminal may execute the puzzle game with the received initial arrangement of blocks. At this time, the game processing unit 130 may continue processing the puzzle game according to the user selecting one of a story mode and an in-turn mode that will be described later.

The item management unit 140 can manage various items used in the game, for example, weapons, clothing, physical strength recovery drugs, and the like. The item management unit 140 may equip an item to the game character or release the item from the game character, in response to a user input through the user terminal 200. The item management unit 140 may provide an item shop where a user can buy or sell items in exchange with game money or the like. Also, the item management unit 140 may monitor use of items and changes attributes of each items according to result of monitoring. For example, some items may disappear under a certain expiration condition. The expiration condition may be a predetermined number of use, elapse of a predetermined time, and the like. Some items may be strengthened or weakened according to repetitive use. The item management unit 140 may monitor if uses of the items meet the expiration condition and/or strengthening (weakening) condition, and then change corresponding attributes of the items according to results of monitoring.

The game skill management unit 150 may manage various game skills to be used by the game character in the puzzle game, for example, a chain skill, a special skill, and the like. For example, the game skill management unit 150 may set the game skills according to user input through the user terminal 200, and level up the game skills according to achievement of the puzzle game.

The game money management unit 160 manages game money of the user A. At this time, the game money may be acquired through completion of the mission of the puzzle game, may be acquired through sale of the item, or may be acquired by various payment methods and other methods.

The story management unit 170 manages a plurality of cues, each of which corresponds to a mission. Each of the plurality of story cues is provided for the user terminal when a corresponding mission is completed. A story cue obtained by the user terminal may be stored in the story management unit 170 or the user terminal 200.

The mercenary management unit 180 registers, in response to a user input of selecting at least one of the user characters, the selected user characters as mercenary character for other users and stores the registered mercenary character. Meanwhile, the mercenary management unit 180 may perform the above mentioned function separately from the character management unit 120, but alternately may be integrated with the character management unit 120 to perform the above mentioned function.

Hereinafter, a process of playing a puzzle game by the game server 100 or by the user terminal 200 described above will be described in detail.

Figure 3:
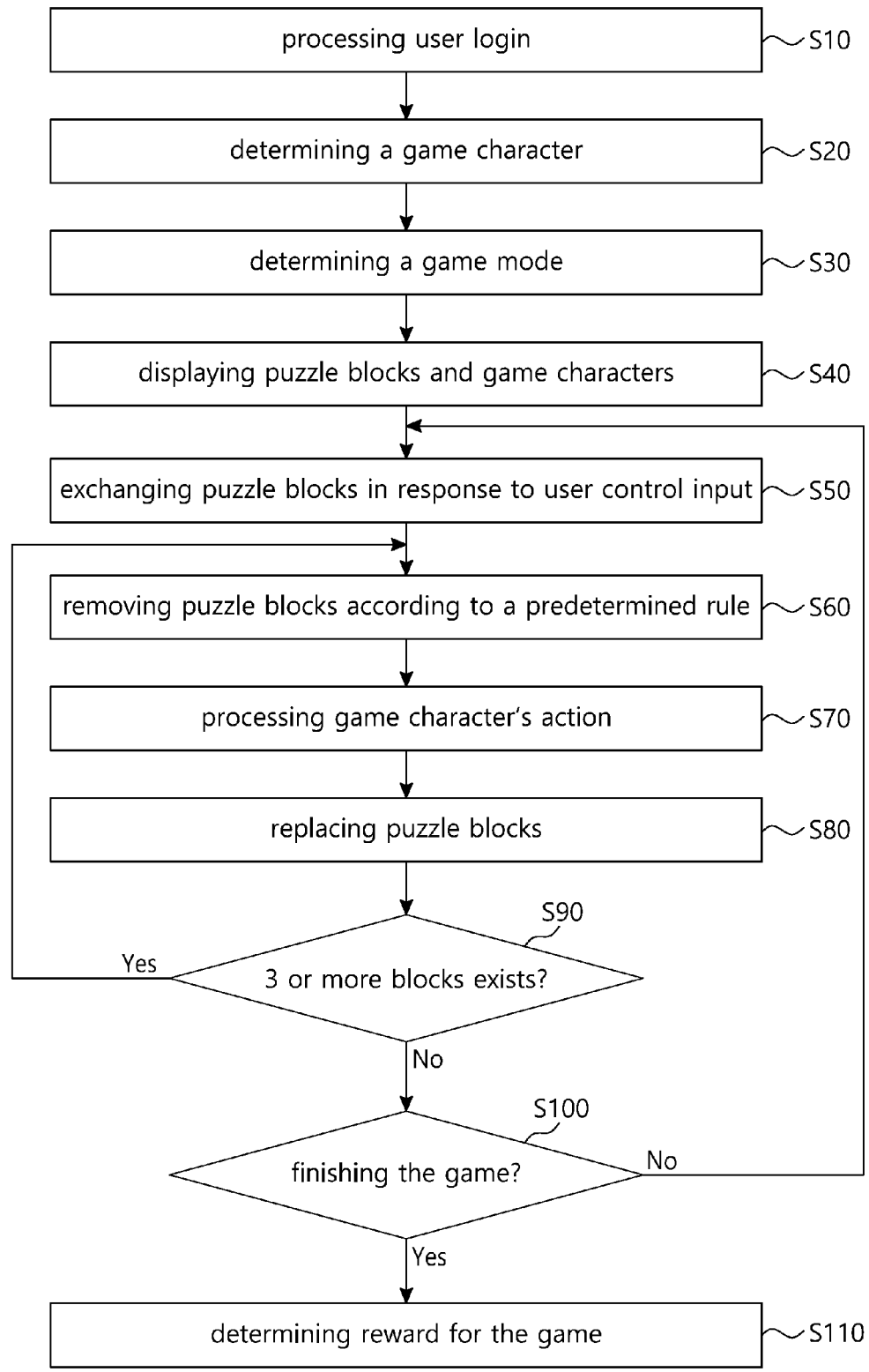
FIG. 3 is a flowchart illustrating processes performed for providing a puzzle game by the game system of FIG. 1.
Figure 4:
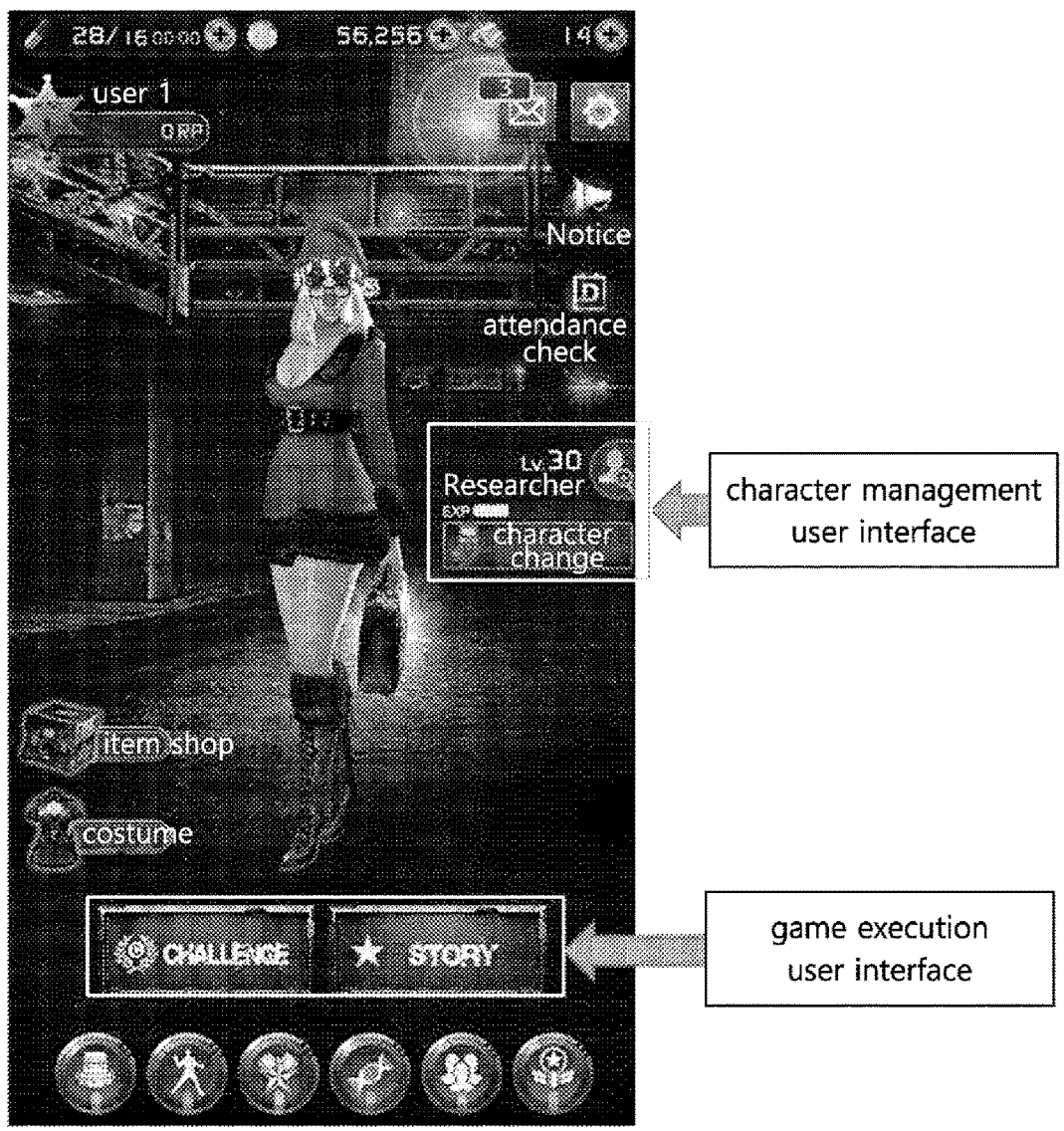
FIG. 4 is a diagram illustrating an exemplary embodiment of a main screen displayed on the user terminal.
Figure 5:
FIG. 5 is an exemplary embodiment of a screen displaying mercenary characters registered by other users.
Figure 6:
FIG. 6 is an exemplary embodiment of a screen registering a user character as a mercenary character to be dispatched for other users.

FIG. 3 is a flowchart illustrating processes performed for providing a puzzle game progress by the game system of FIG. 1, FIG. 4 is a diagram illustrating an example of a main screen displayed on the user terminal, FIG. 5 is a diagram illustrating an example that a mercenary character registered by another user is selected as a game character, and FIG. 6 is an exemplary scree registering user character as a mercenary character to be dispatched for other users.

Referring to FIGS. 3 to 6, a method for playing a puzzle game according to an exemplary embodiment, when the user terminal 200 executes a game program, for example, a game app, the user terminal 200 access the game server 100 with login information for login of the user A via the data network 10 and then the main control unit 110 processes user login, in response to receiving the login information S10. At this time, when the main control unit 110 stores the login information of the user obtained from a previous user login process, the main control unit 110 may automatically perform the login process without requiring any login information from the user terminal 200. Meanwhile, the user login may be performed in conjunction with an account currently used by the user A, for example, an account of Google, Facebook, Naver, and the like.

As such, when the user login process is completed, the user terminal 200 can display the main screen as shown in FIG. 4. Also, the main control unit 110 may control the user terminal 200 to display the main screen after completion of the user login process. For example, in response to completion of the user login process, the main control unit 110 may transmit a user specified data to the user terminal 200 for displaying the user-specified data on the main screen.

Then, the user terminal 200 can determine a game character for performing a game according to a user input (S20). That is, the main control unit 110 may determine the game character in response to user input of selecting one of the user characters as the game character. The process of the user input of the game character may be performed using character management user interface displayed on the user terminal 200.

The main control unit 110 may automatically determine the previously selected character as the game character, in response to determining the user had selected a character in previous playing. When the user desires to change the automatically selected game character to another character, the user terminal 200 may select one of the remaining user characters or the mercenary characters registered by other users to change the game character.

Specifically, for example, the user terminal 200 may touch a "changing character" button of the character management user interface in the main screen to request character change, then the main control unit 110 controls the character management unit 120 to manage characters in response to receiving the user request. The character management unit 120 transmits character information includes currently available user characters and mercenary characters to the user terminal 200 via the main control unit. The user terminal 200 may displays the available characters in a various graphic form using the received character information, then may select one of the available characters displayed on the user terminal 200. In response to the user selection, the character management unit 120 changes the game character. At this time, the character management unit 120 may, in response to a user input, add at least one user character, or at least one mercenary character, to change the game character. Also, in order to hire a mercenary character, the user A may necessarily pay a certain amount of game money to another user who registers the mercenary character.

The user may register the user characters as mercenary characters and dispatches them for other users. The users may transmit a request for mercenary character registration to the game server using a mercenary registering function (not shown) of the character management user interface of the user terminal 200. In response to the request for mercenary character registration, the main control unit 110 can control the mercenary management unit 180 to processing the mercenary character registration. That is, in response to user selecting at least one of the user characters through the character management interface, the mercenary management unit 180 may register the selected user characters possessed as the mercenary characters. At this time, when another user hires a mercenary character registered by the user A, the user A can acquire game money according to the number of times of employment.

Figure 7:
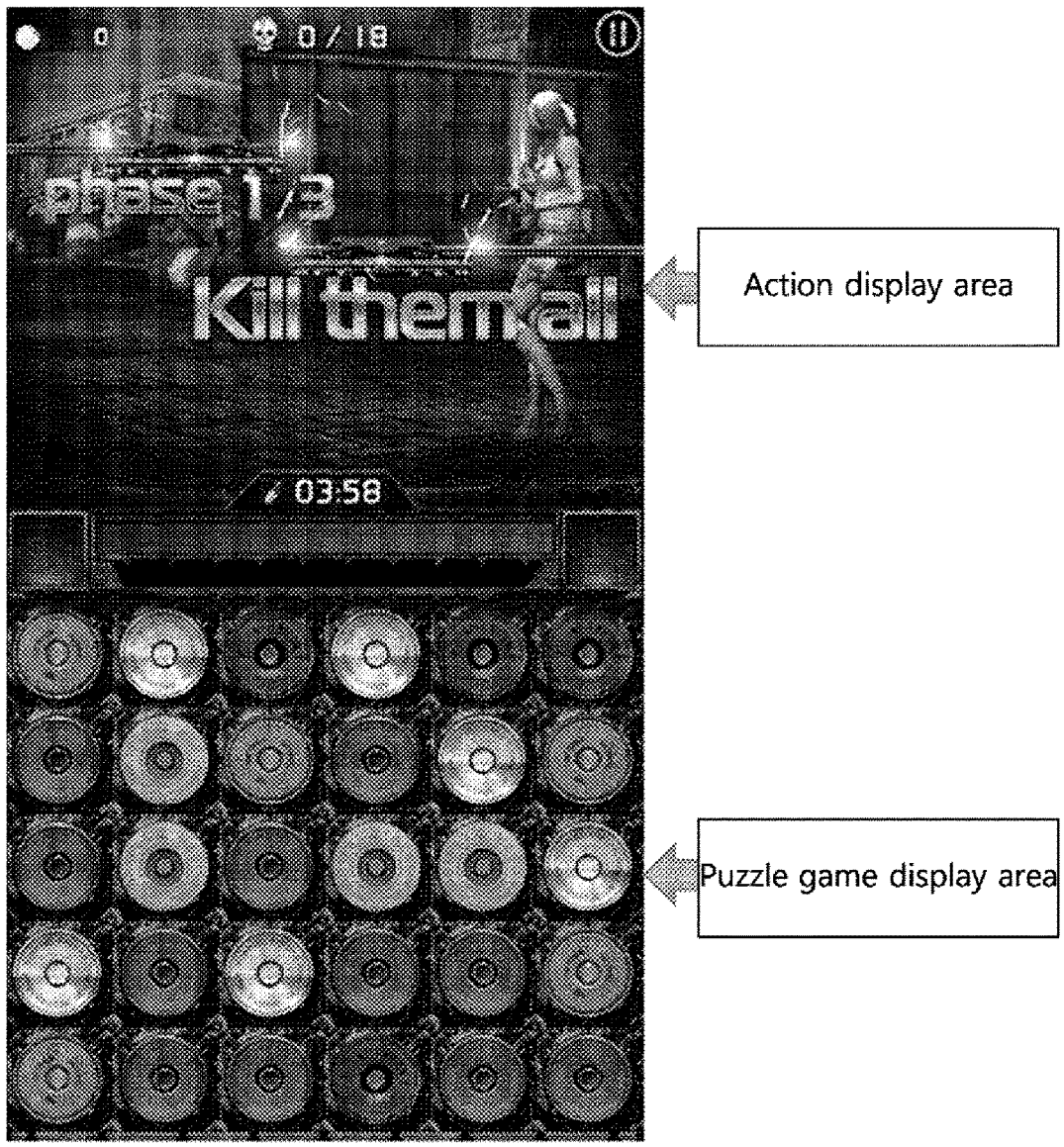
FIG. 7 is an exemplary embodiment of a game execution screen in a story mode.
Figure 8:
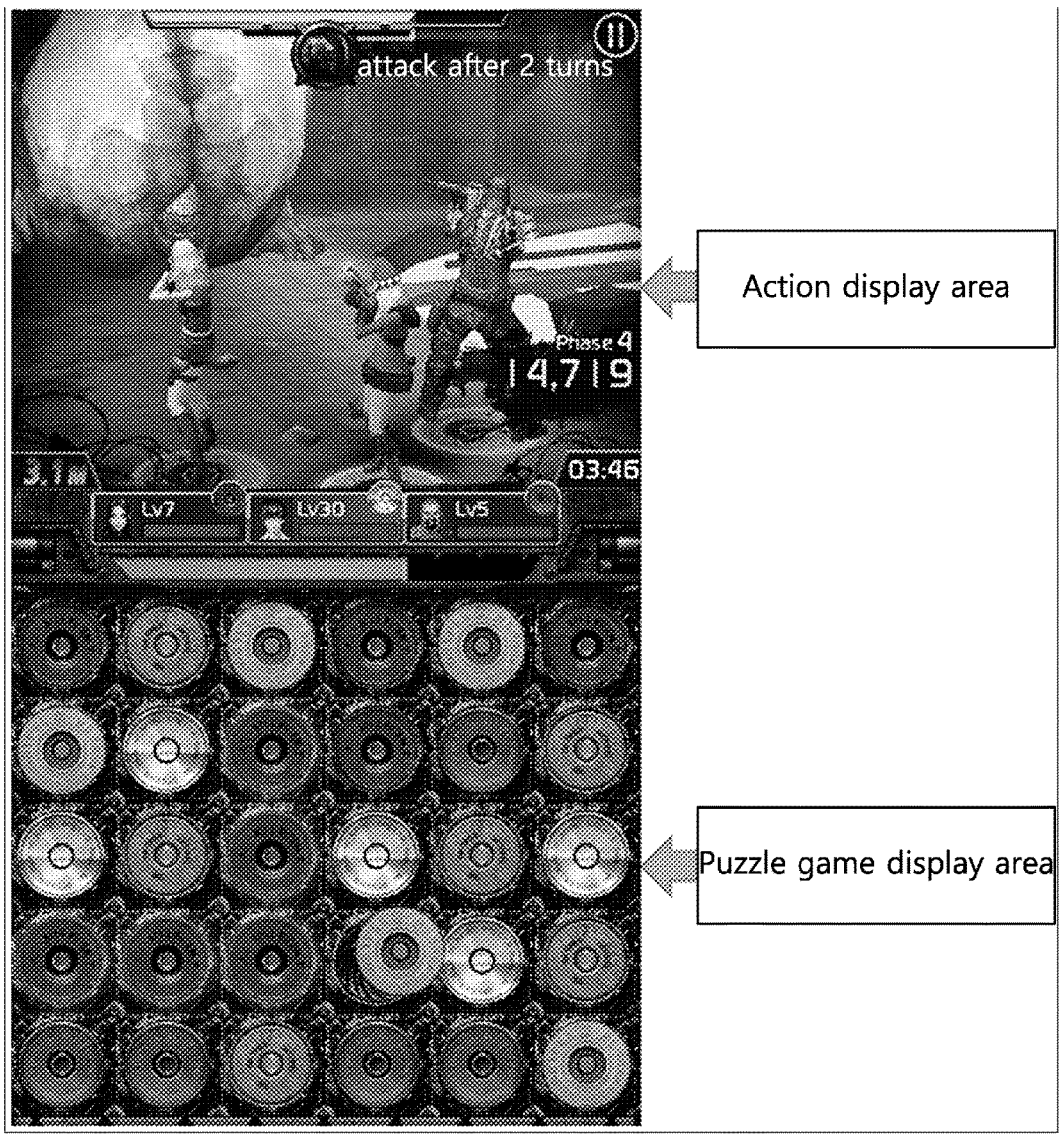
FIG. 8 is an exemplary embodiment of a game execution screen in an in-turn mode.

FIG. 7 is an example of a game execution screen in a story mode, and FIG. 8 is an example of a game execution screen in an in-turn mode.

Referring to FIGS. 4, 7 and 8, the user terminal 200 may select one of the story mode and the in-turn mode by the user mode selection input S30. The user may select a game mode through a mode selection input using a mode selection user interface of the main screen, and then the user terminal 200 transmits a mode selection signal to the game server 100.

Specifically, for example, when the user touches the story mode button in the main screen displayed on the user terminal 200 to transmits a mode selection signal that the user select the story mode, the main control unit 110 controls the game processing unit 130 to providing the puzzle game in the story mode. On the other hand, if the user clicks the challenge mode button in the main screen displayed on the user terminal 200, the main control unit 110 controls the game processing unit 130 to providing the puzzle game in the in-turn mode. That is, the game processing unit 130 may determine one of the story mode and the in-turn mode as game mode in response to a user mode selection signal from the user terminal 200. When the game processing unit 130 determines the story mode as the game mode, the game processing unit 130 processes the puzzle game in the story mode as shown in FIG. 7. And the game processing unit 130 processes the puzzle gam in the in-turn mode as shown FIG. 8 when the game processing unit 130 determines the in-turn mode as the game mode.

Consecutively, after the game processing unit 130 determines the game mode, the user terminal 200 may display a game execution screen including a puzzle game area and an action display area as shown in FIG. 7 or FIG. 8 (S40).

Specifically, for example, the game processing unit 130 may control the user terminal 200 through the main control unit 110 to display the game execution screen on the user terminal 200. In other words, the game processing unit 130 of the game server 100 may generate (or load) gaming data required for execution of the puzzle game on the user terminal 200, e.g., initial arrangement of the blocks, mission to be performed by the game character, and the like, and transmit the gaming data to the user terminal. Then, the user terminal 200 may display the game execution screen according to the gaming data. At this time, the game processing unit 130 may provide blocks, each having a color of one of a plurality of colors, arranged in a matrix of N rows and M columns to be displayed on the puzzle game area (where N and M are each an integer of 3 or more) of the game execution screen, the game character performing an action to be displayed in the action display area of the game execution screen. For example, the blocks may be arranged in five rows and six columns, and the colors of the pivot blocks may include red, blue, green, gray, and purple.

The game processing unit 130 may provide an opponent character as a target of attack, for example, a zombie character to be displayed in the action display area, and control the opponent character to move toward the game character. Here, the movement of the opponent character to the game character may be processed in real time, i.e., according to elapse of time, and may be processed every turn of block exchanging, which will be described below.

More specifically, for example, in the story mode, the game processing unit 130 may control the opponent character to move toward the game character moving backward in real time. Here, when the opponent character moves and reaches the game character, the opponent character may attack the game character to damage the game character. The opponent characters may be generated by the game processing unit 130 in real time and a plurality of opponent characters may be generated by the game processing unit 130.

On the other hand, in the in-turn mode, the game processing unit 130 may be configured to control the opponent character to move forward every completion of a turn of block exchanging of the user. For example, the game processing unit 130 may control the game character to attack the game character every a plurality of turns are completed. That is, the opponent character moves toward the game character after each turn of the user's block exchanging operation, and then, if the opponent character is adjacent to the game character within the reference distance after some turns, the opponent character can attack and damage the game character.

Figure 9:
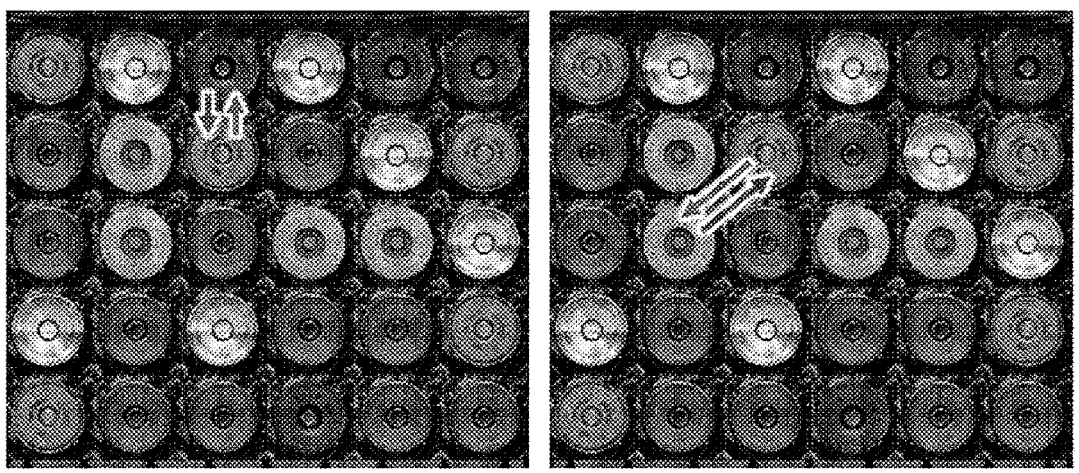
FIG. 9 illustrates an exemplary embodiment of exchanging a block in allowed directions.
Figure 10:
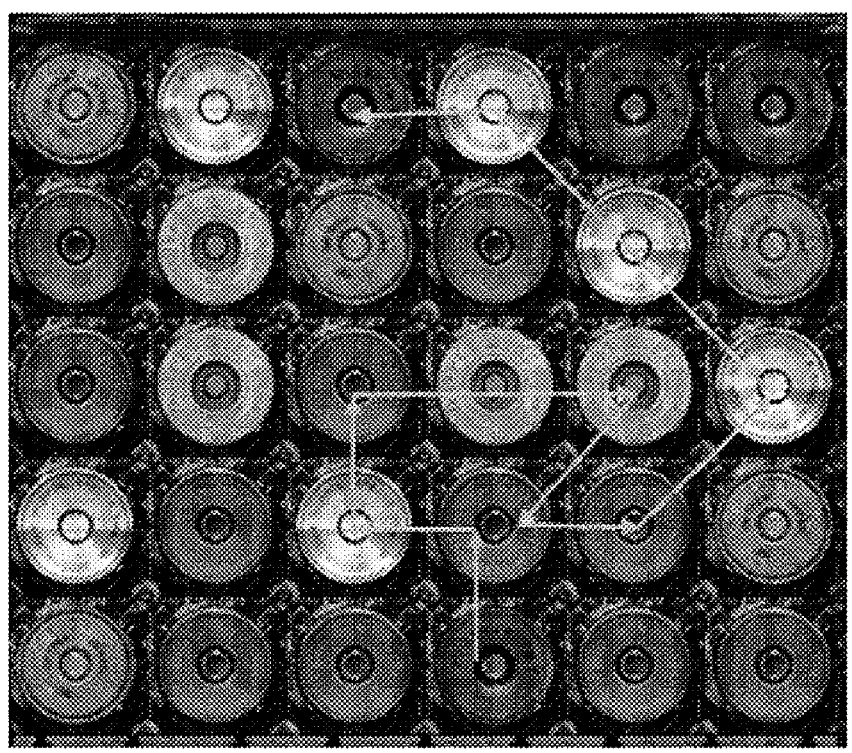
FIG. 10 is a screen illustrating an exemplary embodiment of continuously exchanging blocks according to the method of FIG. 9.

FIG. 9 is a illustrating an example of exchanging block in allowed directions, and FIG. 10 is a screen illustrating an example of continuously exchanging blocks according to the method of FIG. 9.

Referring to FIGS. 9 and 10, when the game execution screen is displayed on the user terminal 200, the user selects one of the blocks displayed in the puzzle game area to is exchange the selected block with one of the upper, lower, left, right, the lower left, the upper right, and the lower right neighboring blocks S50 (hereinafter, referred to as a "block exchanging process").

In other words, the game processing unit 130 may process result of the block exchanging process according to a user control of the selected block.

Also, in the block exchanging process, when the user control of the selected block is continuous, for example when the user control of the block is a drag the selected block through a plurality of blocks as shown in FIG. 10, the game processing unit continuously processes every block exchanging process at each waypoint. At this time, the user control of the selected block may be a touch and drag action for moving the selected block in any one of the upper side, lower side, left side, right side, upper left side, lower left side, upper right side and lower right side. That is, the user can freely exchange blocks in a way of touching and dragging the selected block in a direction of the upper side, the lower side, the left side, the right side, the upper left side, the lower left side, the upper right side and the lower right side.

After the block exchanging process is completed, such as when the user releases the touch of the selected block, the game processing unit 130 determines whether a matching block group composed of at least three consecutive blocks of the same color in a row direction or column direction, and removing the matching block group (hereinafter, referred to as "block removing process") (S60).

Then, the game processing unit 130 may process an action of the game character (hereinafter, referred to as an "action performing process") according to the result of removing the matching block group (S70).

Figure 11:
FIG. 11 is an exemplary embodiment of a screen displaying items installed by a game character in an action display area.

FIG. 11 is an exemplary screen displaying items installed by a game character in an action display area.

Referring to FIG. 11, in the course of the action performing process, when there is one matching block group, the game processing unit 130 may control the game character to perform an action corresponding to the number of matched blocks of the matching block group. For example, the game character can perform attack using a pistol of a plurality of mounted weapons when the number of blocks of the matching block group is 3, and, the game character can perform an attack using a rifle among the mounted item weapons when the number of blocks of the matching block group is 4. At this time, the attack power of the pistol and the rifle may be determined according to the level of each weapon.

In addition, in the course of the action performing process, the game processing unit 130 may control the game character to perform an action according to the distance between the game character and the opponent character. For example, if the distance between the game character and the opponent character is within the reference distance, the game character may use a melee weapon among the mounted item weapons regardless of the number of matched blocks of the matching block group to attack the opponent characters. At this time, the attack power of the melee weapon can be determined according to the level of the weapon.

Figure 12:
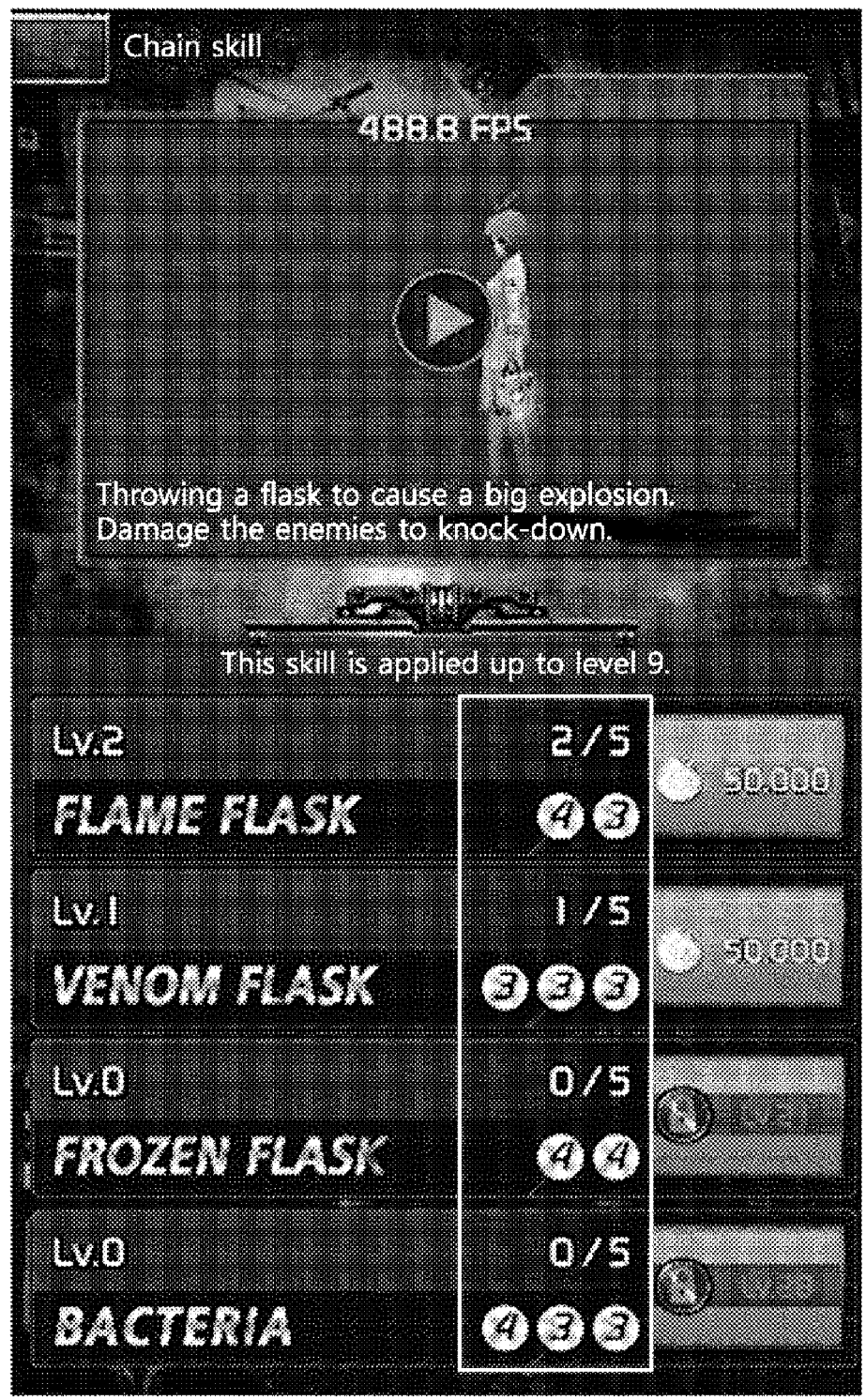
FIG. 12 is an exemplary embodiment of a screen displaying exemplary reference combinations for skills performed by the game character in the action display area.

FIG. 12 is an exemplary screen displaying exemplary reference combinations for chain skill performed by the game character in the action display area.

Referring to FIG. 12, when a plurality of matching block groups are made, the game processing unit determines whether the matching block groups meet one of reference combinations and control the game character to perform an action according to the result of determination. More specifically, if the matching block groups meet a reference combination, the game character is controlled to perform an action corresponding to the reference combination. Otherwise, the game processing unit 130 controls the game character to perform an action corresponding to the number of matched blocks of the matching block group as described above.

According to an exemplary embodiment, the reference combination may be determined by at least one chain skill, respectively. For example, as shown FIG. 12, a first chain skill require a combination of a 4-block matched block group and a 3-block matched block group, a second chain skill requires a combination of three 3-block matched block groups, a third chain skill requires a combination of two 4-block matched block groups, and a forth chain skill requires a combination of a 4-block matched block group and two 3-block matched block groups.

Accordingly, when the matching block groups include any one of the first through fourth chain skills, the game character can perform an attack action corresponding to each of the chain skills. For example, in FIG. 12, the game character may perform "flam flask" attack option if the matched block groups has a 4-block matched block group and a 3-block matched block group. Here, the attack power of the chain skill may be determined according to the level of each skill. On the other hand, if the matching block groups do not include any one of the first through fourth chain skills, the game character may be controlled to attack the opponent character according to the number of matched blocks of the matching block group. Meanwhile, the level of the chain skill may be managed by the game skill management unit 150.

Following the step S70 or at the same time as the step S70, the game processing unit 130 fills spaces which the matching block groups had occupied (hereinafter, referred to as "removed spaces") with replaced blocks (hereinafter, referred to as "block filling process") (S80). Each of the replaced blocks may be a previously neighboring block of each of the matched blocks. If no block had previously been adjacent (i.e., neighboring) the matched block, the game processing unit 130 may generate a replacement block arbitrarily having one of the colors and filling removed space with the generated replacement ("replaced") block. For example, the removed spaces are filled with blocks disposed on the removed block, and when there had been no blocks disposed on the removed blocks or the removed blocks had been on the top, blocks having any one of the colors are generated and fill the removed space.

When the number of matched blocks in the matching block group is equal to or more than a reference number, for example, five or more, in the block filling process, the game processing unit 130 may generate a special block having the same color of the matched blocks, fill one of the removed spaces with the special block, and fill the rest of the removed spaces with the replaced blocks according to the above described method. That is the rest of the removed spaces is filled with the blocks that had been neighbored the matched blocks, or when the no block had not neighbored the matched block, generates a block having any one of the colors. In addition, the game processing unit 130 may be configured to rearrange the blocks according to the block filling process. For example, when the removed space is filled with a replaced block which had been located on top of the removed space, blocks on the replaced block move downward according to the replacing movement of the replaced block.

After performing step S80, the game processing unit 130 may determine whether there are three or more blocks having the same color in the row direction or the column direction S90. At this time, if the game processing unit 130 determines that there are three or more blocks having the same color in the row direction or column direction, the game processing unit 130 may performs the steps S60 to S80 again. That is, the game processing unit 130 continues the block removing process, the action execution process, and the block filling process until three or more blocks having the same color in the row direction or the column direction are not generated. For example, after a block filling process, some of replaced blocks may form, in association with other blocks, a matched block group (hereinafter, referred to as "collateral matched block group"), and then the game processing unit performs the steps S60 to S80 for the collateral matched block group again.

On the other hand, if the game processing unit 130 determines that there is no collateral matched block group, the game processing unit 130 determines whether the game in the game mode is completed (S100). If the game processing unit 130 determines that the game in the game mode is not completed, the game processing unit 130 may perform the steps S50 to S90 again.

Figure 13:
FIG. 13 is an exemplary screen displaying an exemplary embodiment of a special block for a special skill performed by the game character in the action display area.

FIG. 13 is an exemplary screen displaying an exemplary special block for a special skill performed by the game character in the action display area.

Referring to FIG. 13, when the game processing unit 130 determines that the game in the game mode is not completed and the game processing unit 130 performs the block exchanging process in step S50, if the special block is selected by the user input such as touch input, game processing unit 130 processes the puzzle game so that the special block is removed.

If the special block is removed in step S70, the game processing unit 130 may control the game character to perform an action corresponding to the color of the special block. In this exemplary embodiment, as shown in FIG. 13, when the special block is removed, the game character may different special skills according to the color to attack the opponent character. In this regard, the attack power of the special skill may be determined according to the level of each skill. Meanwhile, the level of the special skill may be managed by the game skill management unit 150.

Figure 14:
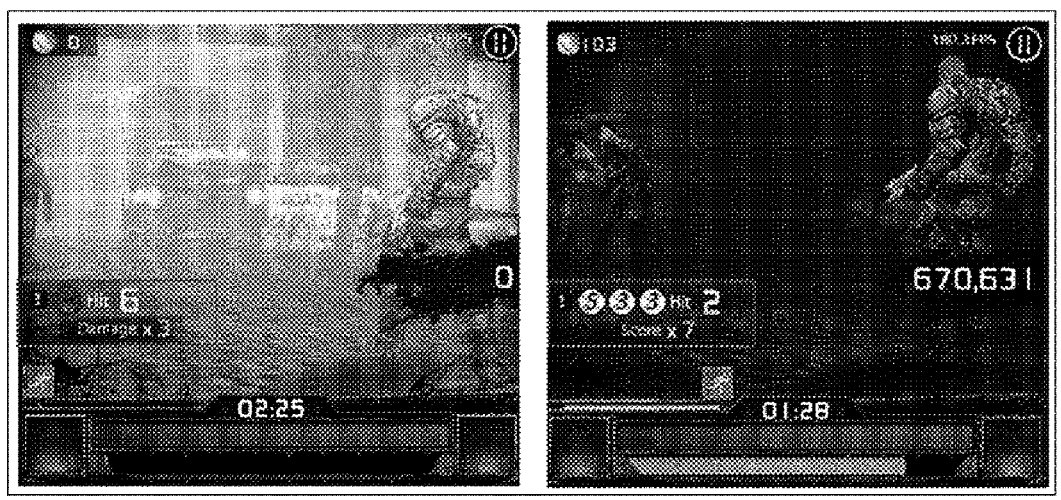
FIG. 14 is an exemplary embodiment of a screen illustrating a state in which a submission is provided during playing the puzzle game.

FIG. 14 is an exemplary screen illustrating a state in which a submission is is provided during playing of the puzzle game.

Referring to FIG. 14, during repeating the steps S50 to S90 when the game is not completed, the game processing unit 130 may provide a submission in real time, and then the user terminal 200 may be display the submission in the action display area. In this case, when the user accomplishes the block matching corresponding to the submission, for example, making six purple matched block groups as shown in FIG. 14, the game processing unit 130 may provide the corresponding compensation, for example, three times damage on the opponent character as shown in FIG. 14, in real time.

Then, in step S100, when the game in the selected mode is completed, the game processing unit 130 may provide the user A with various compensation (e.g., game money, points, items, etc.) according to the completion of the game.

Figure 15:
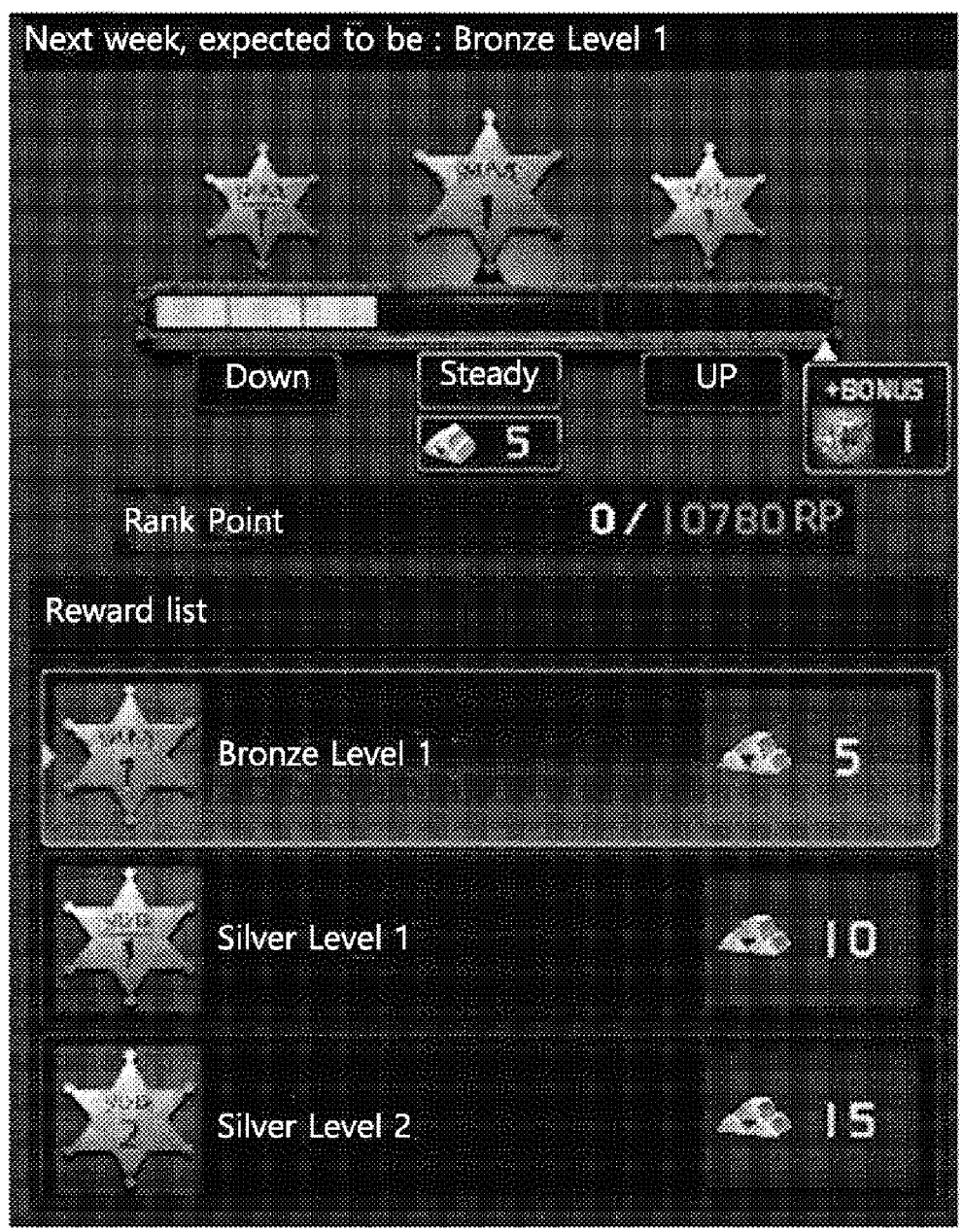
FIG. 15 is an exemplary embodiment of a screen displaying user rank information.
Figure 16:
FIG. 16 is an exemplary embodiment of a screen displaying an item shop providing items available for purchase according to the rank of the user.

FIG. 15 is an exemplary screen displaying user rank information, and FIG. 16 is an exemplary screen displaying an item shop providing items available for purchase according to the rank of the user.

Referring to FIGS. 15 and 16, the game processing unit 130 may provide the user A with a rank score. At this time, the rank of the user A can be changed according to the accumulated rank score. The main control unit 110 may be configured to periodically provide game money to the user A according to the rank of the user A, as shown FIG. 15, and may be configured to provide different available items, which the user A can purchase a the item shop with the game money, according to the rank of the user A, as shown in FIG. 16.

Figure 17:
FIG. 17 is an exemplary embodiment of a screen displaying rescuees of missions.
Figure 18:
FIG. 18 is an exemplary embodiment of a screen displaying success of rescue according to completion of mission execution.
Figure 19:
FIG. 19 is an exemplary embodiment of a screen displaying a storybook including a plurality of story cues.
Figure 20:
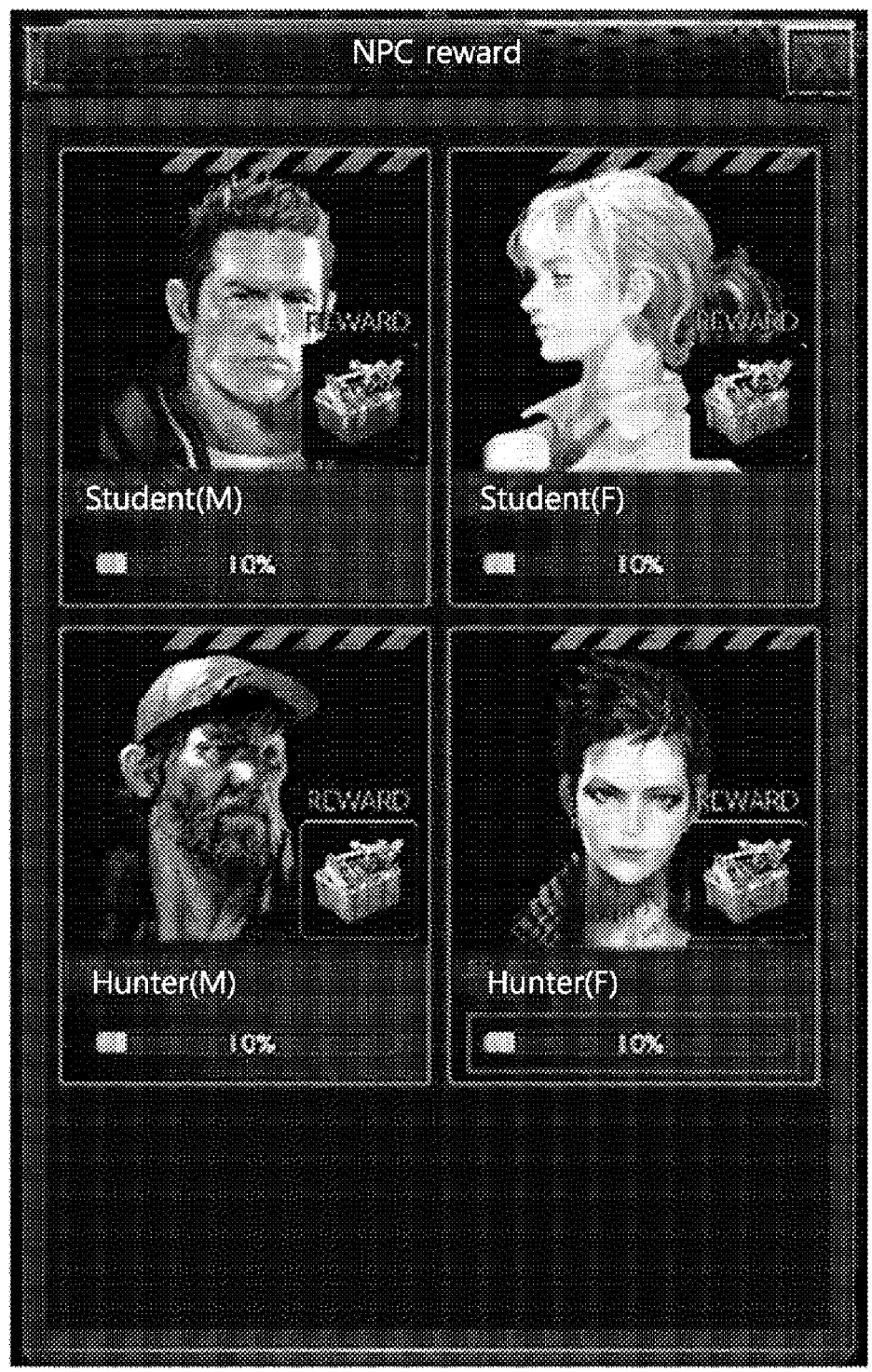
FIG. 20 is an exemplary embodiment of a screen displaying additional compensation for repetitive rescues of the same rescuee.
Figure 21:
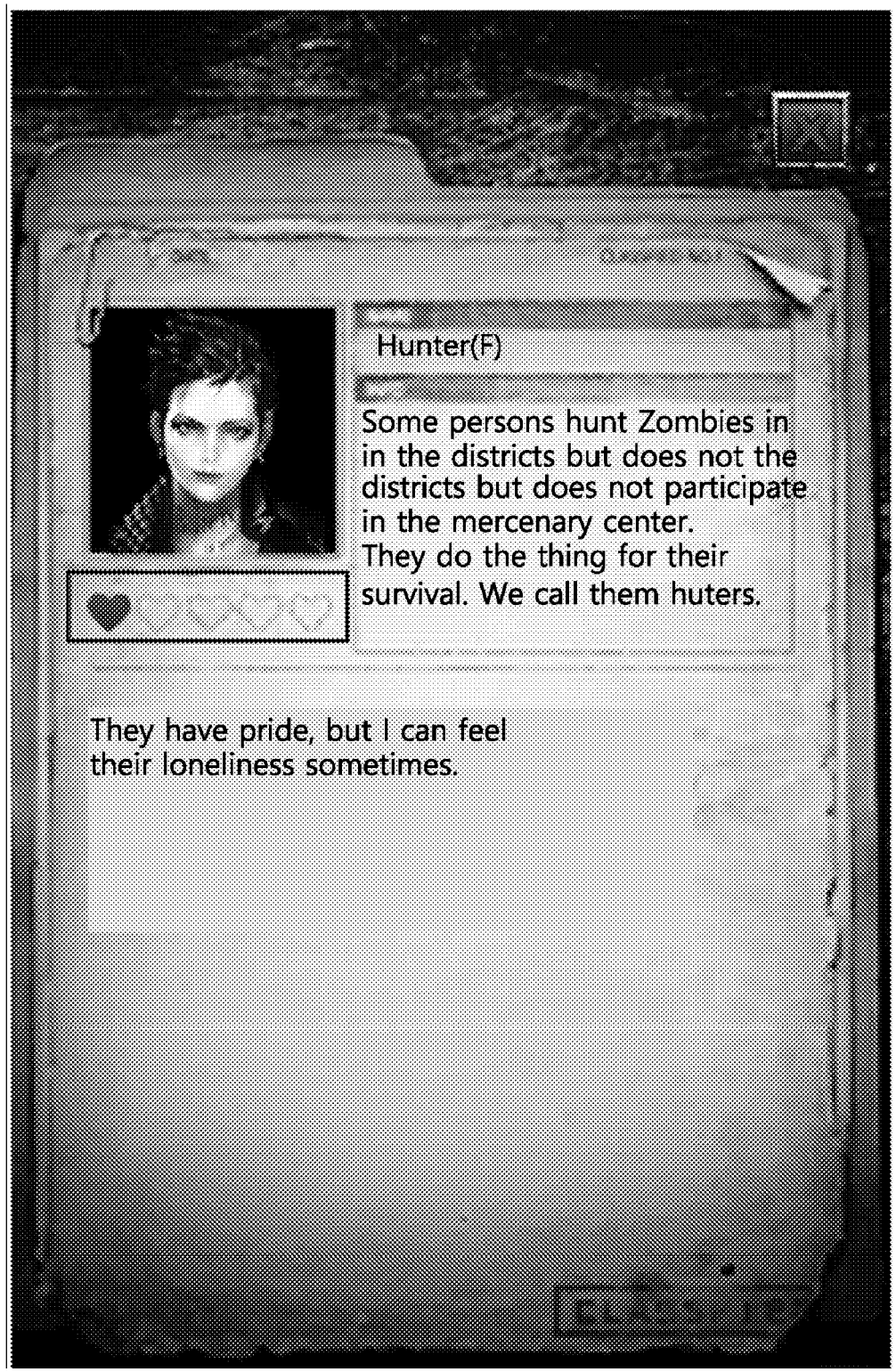
FIG. 21 is an exemplary embodiment of a screen displaying user affinity with a rescuee according to repetitive rescue.

FIG. 17 is an exemplary screen displaying rescuees of missions, FIG. 18 is an exemplary screen displaying success of rescue according to completion of mission execution, FIG. 19 is an exemplary screen displaying a storybook including a plurality of story cues, FIG. 20 is an exemplary screen displaying additional compensation for repetitive rescues of the same rescuee, and FIG. 21 is an exemplary screen displaying user affinity with a rescuee according to repetitive rescue Referring to FIGS. 17 to 21, when the game character completes the mission in the story mode and a rescuee character related to the mission is rescued as a result, the game processing unit 130 may provide the user A with at least a part of the story cues held by the rescuee character. At this time, the main control unit 110 may store the obtained story cues in the storybook of the story management unit 170. On the other hand, each of the rescuee characters may have different story cues.

According to an exemplary embodiment, a rescuee character may be repeatedly rescued many times. In this case, the game processing unit 130 may provide additional compensation, or increase user affinity with the rescuee character according to the repetitive rescue. Here, the degree of disclosure of the story cue possessed by the rescuee character may be changed according to the user affinity with the rescuee character.

As described above, according to the present exemplary embodiment, a user interest in the puzzle game can be doubled up because a game character performs a mission by actions according to results of playing the puzzle game.

In addition, when the user completes the mission by the action of the game character while playing the game in the story mode, the game server 100 provides the user with story cues corresponding to the mission. Therefore, users have more collecting story cues through games.

In addition, in the puzzle game, the movement of the block can be performed not only in the four directions of the upper, lower, left, and right but also in the diagonal directions between the directions, so that the user can more freely control movement of the block.

In addition, when the matching result of the puzzle game includes matching of the reference combination, the action of the game character can be performed with the chain skill corresponding to the reference combination.

The foregoing devices and units may be realized by hardware elements, software elements and/or combinations thereof. For example, the devices, units, and elements illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Alternatively, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, elements, physical equipment, virtual equipment, computer storage media or units or transmitted signal waves so as to be interpreted by the processing unit or to provide instructions or data to the processing unit. Software may be distributed throughout computer systems connected via networks and be stored or executed in a distribution manner. Software and data may be recorded in one or more computer-readable storage media.

The methods according to the above-described exemplary embodiments of the inventive concept may be recorded in computer-readable media including program instructions to implement various operations embodied by a computer. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and files containing higher level code that may be executed by the computer using an interpreter. The described hardware devices may be configured to act as one or more software modules to perform the operations of the above-described exemplary embodiments of the inventive concept, or vice versa.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A method performed by a user terminal for providing a puzzle game in connection with a game server via a data network, comprising steps of:
    displaying blocks arranged in a matrix form of N rows and M columns, wherein N and M are each an integer of 3 or more, in a puzzle game area, each of the blocks having one of a plurality of colors, and to display a game character in an action display area;
    selecting a one of the blocks as a selected block in response to a user block selection input and exchanging the selected block with another block neighboring the selected block in a direction of upper, lower, left, right, upper left, lower left, upper right, and lower right to perform a block exchanging step in response to a user block control input;
    determining if a matching block group is generated as a result of the block exchanging step, the matching block group consist of at least three consecutive blocks having the same color in a row direction or a column direction;
    removing the matching block group in a block removing step; and
    controlling the game character to perform an action according to a result of the block removing step in a game character action control step,
    wherein the game character action control step comprises a step of controlling the game character to perform the action differently according to a number of blocks of the matching block group when the matching block group is one.

2. The method according to claim 1, wherein, in the block exchanging step, when the user block control input is a continuous movement through a plurality of blocks, exchanging the selected block and each of the plurality of blocks is performed continuously following the movement.

3. The method of claim 1, wherein the user block control input is a drag input for moving the selected block in any one of an upper direction, a lower direction, a left side, a right direction, an upper left direction, a lower left direction, an upper right direction, and a lower right direction.

4. The method according to claim 1, further comprising steps of, after the block removing step:
filling block-removed spaces with substitution blocks from neighboring blocks, each of which was placed at a side of each block of the matching block group, and generating a block having one of the colors to fill the block-removed space if no substitution block exists in a block filling step, wherein the block-removed spaces are spaces that had been occupied by the matching block group before removing the matching block group; and
repeating the block removing step, the game character action control step, and the block filling step until three or more consecutive blocks having the same color in the row direction or the column direction are not generated.

5. The method of claim 4, wherein the block filling step comprises:
generating a special block having the same color of the matching block group and filling one of the block-removed spaces when a number of blocks in the matching block group is equal to or greater than a predetermined number; and
filling other spaces of the block-removed spaces with the substitution blocks; and
generating a block having one of the colors to fill the block-removed space if no substitution block exists.

6. The method according to claim 5, further comprising, when the special block is selected by the user block selection input, removing the special block.

7. The method of claim 6, wherein the game character action control step comprises a step of controlling the game character to execute an action corresponding to the color of the special block when the special block is removed.

8. The method of claim 6, further comprising steps of:
filling a space that was occupied by the special block according to performing the block filling step; and
repeating the block removing step, the game character action control step, and the block filling step until three or more consecutive blocks having the same color in the row direction or the column direction are not generated.

9. The method of claim 1, wherein the game character action control step further comprises steps of, when at least a plurality of matching block groups exist:
controlling the game character to perform the action differently in accordance with the number of blocks of the plurality of matching block groups does not meet at least one reference combination; and
controlling the game character to execute an action corresponding to the reference combination if the plurality of matching block groups meet the at least one reference combination.

10. The method of claim 1, further comprising steps of displaying an opponent character together with the game character and controlling the opponent character to move toward the game character in real time.

11. The method of claim 10, wherein the game character action control step comprises a step of controlling the game character to perform the action differently according to a proximity distance between the game character and the opponent character.

12. The method of claim 10, further comprising a step of:
determining a game mode, in response to a user mode selection input selecting one of a story mode where the game character performs a mission and an in-turn mode where the game character and the opponent character perform actions alternately,
wherein, in the game character action control step, the action performed by the game character is controlled according to the game mode.

13. The method of claim 12, wherein, in the in-turn mode, the game character performs the action every turn and the opponent character performs one reaction in multiple turns.

14. The method of claim 12, wherein, in the in-turn mode, the opponent character performs a reaction only when the opponent character is within a reference distance from the game character.

15. The method of claim 12, when the game mode is the story mode and the game character completes the mission, further comprising a step of acquiring at least a portion of a plurality of story cues, wherein the at a portion of a plurality of story cues corresponds to the mission.

16. The method of claim 1, further comprising selecting one of at least one selectable character by a user character selection input to determine the game character.

17. A method, performed by a game server, for providing a puzzle game, comprising steps of:
processing a user login in response to a request from a user terminal through a data network; and
controlling the user terminal to execute the puzzle game in response to a game execution request of the user terminal,
wherein the step of controlling the user terminal to execute the puzzle game comprises:
controlling the user terminal to display blocks arranged in a matrix form of N rows and M columns, wherein N and M are each an integer of 3 or more, in a puzzle game area, each of the blocks having one of a plurality of colors, and to display one game character in an action display area;
exchanging a selected block selected by a user block selection input with another block neighboring the selected block in a direction of upper, lower, left, right, upper left, lower left, upper right, and lower right in a block exchanging step in response to a user block control input;
determining if determining if a matching block group is generated as a result of the block exchanging step, the matching block group consist of at least three consecutive blocks having the same color in a row direction or a column direction;
removing the matching block group in a block removing step;
controlling the game character to perform an action according to a result of the block removing step in a game character action control step;
after the block removing step, filling block-removed spaces with substitution blocks from neighboring blocks, each of which was placed at a side of each block of the matching block group, and generating a block having one of the colors to fill the block-removed space if no substitution block exists in a block filling step, wherein the block-removed spaces are spaces that had been occupied by the matching block group before removing the matching block group; and
repeating the block removing step, the game character action control step, and the block filling step until three or more consecutive blocks having the same color in the row direction or the column direction are not generated, wherein the block filling step comprises:

generating a special block having the same color of the matching block group and filling one of the block-removed spaces when a number of blocks in the matching block group is equal to or greater than a predetermined number; and filling other spaces of the block-removed spaces with the substitution blocks; and generating a block having one of the colors to fill the block-removed space if no substitution block exists, wherein the executing the puzzle game comprises a step of, when the special block is selected by the user block selection input, removing the special block, wherein the game character action control step comprising step of controlling the game character to perform an action corresponding to the color of the special block when the special block is removed.

18. The method of claim 17, wherein, in the block exchanging step, when the user block control input is a continuous movement through a plurality of blocks, exchanging the selected block and each of the plurality of blocks is performed continuously following the movement.

19. The method of claim 17, wherein the user block control input is a drag input for moving the selected block in any one of an upper direction, a lower direction, a left side, a right direction, an upper left direction, a lower left direction, an upper right direction, and a lower right direction.

20. The method of claim 17, wherein executing the puzzle game comprises steps of:

filling a space that was occupied by the special block according to performing the block filling step repeating the block removing step, the game character action control step and the block filling step until three or more consecutive blocks having the same color in the row direction or the column direction are not generated.

21. The method of claim 17, wherein the game character action control step comprises a step of controlling the game character to perform the action differently according to a number of blocks of the matching block group when the matching block group is one.

22. The method of claim 21, wherein when at least a plurality of matching block groups exist, the game character action control step further comprises steps of:

controlling the game character to perform the action differently in accordance with the number of blocks of the matching block group when the plurality of matching block groups do not meet at least one reference combination; and controlling the game character to perform an action corresponding to the reference combination if the plurality of matching block groups meet the at least one reference combination.

23. The method of claim 17, wherein executing the puzzle game comprises steps of displaying an opponent character together with the game character and control the opponent character to move toward the game character in real time.

24. The method of claim 23, wherein the game character action control step comprises a step of controlling the game character to perform the action differently according to a proximity distance between the game character and the opponent character.

25. The method of claim 23, wherein executing the puzzle game comprises steps of:

selecting, in response to a user mode selection input, a game mode consisting of one of a story mode where the game character performs a mission, and an in-turn mode where the game character and the opponent character perform actions alternately, wherein, in an action execution step, the action performed by the game character is controlled according to the game mode.

26. The method of claim 25, wherein, in the in-turn mode, the game character performs the action every turn and the opponent character performs one reaction in multiple turns.

27. The method of claim 25, wherein, in the in-turn mode, the opponent character performs a reaction only when the opponent character is within a reference distance from the game character.

28. The method of claim 25, when the selected mode is the story mode and the game character completes the mission, further comprising a step of acquiring at least a portion of a plurality of story cues, wherein the at a portion of a plurality of story cues corresponds to the mission.

29. The method of claim 17, further comprising a step of selecting one of at least one selectable character by a user character selection input to determine the game character.

30. The method of claim 29, wherein the at least one selectable character includes at least one user character owned by the user of the user terminal.

31. The method of claim 30, wherein the at least one selectable character further includes at least one mercenary character registered by another user.

32. The method of claim 30, further comprising a step of selecting at least one of the user characters to register the selected user character as a mercenary character in response to a user input.

33. A game server comprising:

a main processing unit, connected to a user terminal via a data network, configured to perform user login; and a game processing unit configured to control the user terminal to execute a puzzle game in response to a game execution request signal from the user terminal, wherein the game processing unit processes:

controlling the user terminal to display blocks arranged in a matrix form of N rows and M columns, wherein N and M are each an integer of 3 or more, in a puzzle game area, each of the blocks having one of a plurality of colors, and to display one game character in an action display area;

exchanging a selected block, selected by a user block selection input, with another block neighboring the selected block in a direction of upper, lower, left, right, upper left, lower left, upper right, and lower right in a block exchanging step in response to a user block control input;

determining if a matching block group is generated as a result of the block exchanging step, the matching block group consist of at least three consecutive blocks having the same color in a row direction or a column direction;

removing the matching block group in a block removing step;

controlling the game character to execute an action according to a result of the block removing step in a game character action control step;

filling block-removed spaces with substitution blocks from neighboring blocks, each of which was placed at a side of each block of the matching block group, and generating a block having one of the colors to fill the block-removed space if no substitution block exists in a block filling step, wherein the block-removed spaces are spaces that had been occupied by the matching block group before removing the matching block group; and repeating the block removing step, the game character action control step and the block filling step until three or more consecutive blocks having the same color in the row direction or the column direction are not generated, wherein the block filling step comprises:

generating a special block having the same color of the matching block group and filling one of the block-removed spaces when a number of blocks in the matching block group is equal to or greater than a predetermined number;

filling other spaces of the block-removed spaces with the substitution blocks; and generating a block having one of the colors to fill the block-removed space if no substitution block exists, wherein the game processing unit is further configured to perform a process of removing the special block when the special block is selected by the user block selection input wherein the game processing unit is further configured to perform a process of controlling the game character to perform an action corresponding to the color of the special block when the special block is removed.

34. The game server of claim 33, wherein, in the block exchanging step, when the user block control input is a continuous movement through a plurality of blocks, exchanging the selected block and each of the plurality of blocks is performed continuously following the movement.

35. The game server of claim 33, wherein the user block control input is a drag input for moving the selected block in any one of an upper direction, a lower direction, a left side, a right direction, an upper left direction, a lower left direction, an upper right direction, and a lower right direction.

36. The game server of claim 33, wherein the game processing unit is further configured to perform processes of:

filling a space that was occupied by the special block according to performing the block filling step repeating the block removing step, the game character action control step, and the block filling step until three or more consecutive blocks having the same color in the row direction or the column direction are not generated.

37. The game server of claim 33, wherein the action executing process comprises controlling the game character to perform the action differently according to a number of blocks of the matching block group when the matching block group is one.

38. The game server of claim 37, wherein, when at least a plurality of matching block groups exist, the action executing process further comprises processes of:

controlling the game character to perform the action differently in accordance with the number of blocks of the matching block group when the plurality of matching block groups do not meet at least one reference combination; and controlling the game character to perform an action corresponding to the reference combination if the plurality of matching block groups meet the at least one reference combination.

39. The game server of claim 33, wherein the game processing unit is further configured to perform processes of displaying an opponent character together with the game character and controlling the opponent character to move toward the game character in real time.

40. The game server of claim 39, wherein the game processing unit is further configured to perform a process of selecting, in response to a user selection input, a game mode consisting of one of a story mode where the game character performs a mission, and an in-turn mode where the game character and the opponent character perform actions alternately, wherein, in the action executing process, the action performed by the game character is controlled according to the game mode.

41. The game server of claim 40, wherein, in the in-turn mode, the game character performs the action every turn and the opponent character performs one reaction in multiple turns.

42. The game server of claim 40, wherein, in the in-turn mode, the opponent character performs a reaction only when the opponent character is within a reference distance from the game character.

43. The game server of claim 40, wherein, when the selected mode is the story mode and the game character completes the mission, the game processing unit is further configured to performs a process of acquiring at least a portion of a plurality of story cues, wherein the at a portion of a plurality of story cues corresponds to the mission.

44. The game server of claim 39, wherein the action executing process comprises a process of controlling the game character to perform the action differently according to a proximity distance between the game character and the opponent character.

45. The game server of claim 33, further comprising a character management unit configured to determine the game character in response to a character selection user input selecting one of at least one selectable character.

46. The game server of claim 45, wherein the at least one selectable character includes at least one user character owned by the user of the user terminal.

47. The game server of claim 46, wherein the at least one selectable character further includes at least one mercenary character registered by another user.

48. The game server of claim 46, wherein the character management unit is further configured to perform a process of selecting at least one of the user characters to register the selected user character as a mercenary character in response to a user input.

* * * * *